(12) United States Patent
Raghuram et al.

(10) Patent No.: US 12,316,751 B2
(45) Date of Patent: May 27, 2025

(54) SECRET ZERO GENERATION AND USAGE

(71) Applicant: FMR LLC, Boston, MA (US)

(72) Inventors: Rayan Raghuram, Boston, MA (US); Mrinal Malhotra, Boston, MA (US); Paul Vetrano, Boston, MA (US)

(73) Assignee: FMR LLC, Boston, MA (US)

(*) Notice: Subject to any disclaimer, the term of this patent is extended or adjusted under 35 U.S.C. 154(b) by 249 days.

(21) Appl. No.: 18/143,332

(22) Filed: May 4, 2023

(65) Prior Publication Data

US 2024/0372701 A1    Nov. 7, 2024

(51) Int. Cl.
*H04L 9/08* (2006.01)
*H04L 9/32* (2006.01)

(52) U.S. Cl.
CPC .......... *H04L 9/0825* (2013.01); *H04L 9/0866* (2013.01); *H04L 9/3247* (2013.01)

(58) Field of Classification Search
CPC . H04L 9/08; H04L 9/32; H04L 9/0825; H04L 9/0866; H04L 9/3247
See application file for complete search history.

(56) References Cited

U.S. PATENT DOCUMENTS

| | | | |
|---|---|---|---|
| 2021/0042829 A1* | 2/2021 | Wright | H04L 9/3066 |
| 2023/0231727 A1* | 7/2023 | Fletcher | H04L 9/3255 713/176 |
| 2024/0380581 A1* | 11/2024 | Pettit | H04L 9/50 |

OTHER PUBLICATIONS

Desmedt, Yvo, et al., "Threshold Cryptosystems," Springer-Verlag Berlin Heidelberg, G. Brassard (Ed.), Advances in Cryptology—CRYPTO '89, LNCS 435, 1990, pp. 307-315.

Elgamal, Taher, "A Public Key Cryptosystem and a Signature Scheme Based on Discrete Logarithms," Hewlett-Packard Labs, Springer-Verlag Berlin Heidelberg, G. R. Blakley and D. Chaum (Eds.), Advances in Cryptology—CRYPTO '84, LNCS 196, 1985, pp. 10-18.

"Federal Information Processing Standards Publication 197: Announcing the Advanced Encryption Standard (AES)," National Institute of Standards and Technology, Withdrawn NIST Technical Series Publication, Nov. 26, 2001, pp. 1-52.

(Continued)

Primary Examiner — Jayesh M Jhaveri
(74) Attorney, Agent, or Firm — Cesari and McKenna, LLP

(57) ABSTRACT

A computer implemented method is provided for creating and using a secret zero by multiple participants in a group. The secret zero is representative of a master secret that protects other secrets. The method includes creating, by a computing device of each participant, a message comprising a second public key, a commitment to a polynomial, a plurality of encrypted private key shares assigned to the other participants, a plurality of signatures associated with the private key shares assigned to the other participants, and a commitment of a symmetric key. The method also includes broadcasting, by the computing device of each participant, an encrypted version of the message to the group of participants. The method further includes broadcasting, by the computing device of each participant, the symmetric key to the group after all other participants have completed broadcasting their messages.

20 Claims, 9 Drawing Sheets

(56) References Cited

OTHER PUBLICATIONS

Feldman, Paul, "A Practical Scheme for Non-Interactive Verifiable Secret Sharing," IEEE, IEEE Xplore, 28th Annual Symposium on Foundations of Computer Science (sfcs 1987), Los Angeles, CA, USA, Oct. 12-14, 1987, pp. 427-437.
Gennaro, Rosario, et al., "Secure Distribution Kay Generation for Discrete-Log Based Cryptosystems," International Association for Cryptologic Research, Journal of Cryptology, vol. 20, May 19, 2006, pp. 51-83.
Neji, Wafa, et al., "Distributed Key Generation Protocol with a New Complaint Management Strategy," Security and Communication Networks, Research Article, Security Communication Networks 2016, vol. 9, Wiley Online Library, Oct. 17, 2016, pp. 4585-4595.
Pedersen, Torben Pryds, "A Threshold Cryptosystem Without a Trusted Party," Springer-Verlag Berlin Heidelberg, D. W. Davies (Ed.): Advances in Cryptology—EUROCRYPT '91, LNCS 547, 1991, pp. 522-526.
Pedersen, Torben Pryds, "Non-Interactive and Information-Theoretic Secure Verifiable Secret Sharing," Springer-Verlag Berlin Heidelberg, J. Feigenbaum (Ed.): Advances in Cryptology—CRYPTO '91, LNCS 576, 1992, pp. 129-140.
Shamir, Adi, "How to Share a Secret," Programming Techniques, ACM, Communications of the ACM, R. Rivest (Editor), vol. 22, No. 11, Nov. 1979, pp. 612-613.

\* cited by examiner

|  | Private Keys — 502 | Public Keys — 504 |
|---|---|---|
| Participant-1; | 312 | 477 |
| Participant-2; | 136 | 699 |
| Participant-3; | 184 | 913 |

[Previous] [Next]

FIG. 5

Private key (Key 2) —502

| | |
|---|---|
| Participant-1: | 312 |
| Participant-2: | 136 |
| Participant-3: | 184 |

Polynomial Coefficients —602

| | |
|---|---|
| Participant-1: | ["312", "430"] |
| Participant-2: | ["136", "163"] |
| Participant-3: | ["184", "481"] |

[Previous] [Next]

FIG. 6

Polynomial Coefficients —602

| | |
|---|---|
| Participant-1: | ["312", "430"] |
| Participant-2: | ["136", "163"] |
| Participant-3: | ["184", "481"] |

VSS Commitments —702

| | |
|---|---|
| Participant-1: | ["477", "939"] |
| Participant-2: | ["699", "483"] |
| Participant-3: | ["913", "24"] |

[Previous] [Next]

FIG. 7

| | 802<br>My Retained<br>Share | 804<br>My Polynomial<br>Coefficients | 810<br>Encrypt shares for<br>me with my<br>(public key 1) | 806<br>Shares<br>for others | 808<br>Encrypted shares<br>for others | 812<br>Share Signatures for<br>others with my<br>(private key 2) |
|---|---|---|---|---|---|---|
| Participant-1: | 251 | ["312", "430"] | 233 | [<br>{<br>"to": "Participant-2",<br>"value": "190"<br>},<br>{<br>"to": "Participant-3",<br>"value": "129"<br>}<br>] | [<br>{<br>"to": "Participant-2",<br>"value": {<br>"c1": "846",<br>"c2": "462"<br>}<br>},<br>{<br>"to": "Participant-3",<br>"value": {<br>"c1": "711",<br>"c2": "571"<br>}<br>}<br>] | [<br>{<br>"to": "Participant-2",<br>"value": {<br>"s1": "322",<br>"s2": "386"<br>}<br>},<br>{<br>"to": "Participant-3",<br>"value": {<br>"s1": "330",<br>"s2": "242"<br>}<br>}<br>] |
| Participant-2: | 462 | ["136", "163"] | 49 | [<br>{<br>"to": "Participant-1",<br>"value": "299"<br>},<br>{<br>"to": "Participant-3",<br>"value": "134"<br>}<br>] | [<br>{<br>"to": "Participant-1",<br>"value": {<br>"c1": "896",<br>"c2": "153"<br>}<br>},<br>{<br>"to": "Participant-3",<br>"value": {<br>"c1": "578",<br>"c2": "709"<br>}<br>}<br>] | [<br>{<br>"to": "Participant-1",<br>"value": {<br>"s1": "133",<br>"s2": "165"<br>}<br>},<br>{<br>"to": "Participant-3",<br>"value": {<br>"s1": "970",<br>"s2": "268"<br>}<br>}<br>] |

FROM FIG. 8A

| Participant-3: | 154 | ["184", "481"] | 144 | [<br>{<br>"to": "Participant-1",<br>"value": "174"<br>},<br>{<br>"to": "Participant-2",<br>"value": "164"<br>}<br>] | [<br>{<br>"to": "Participant-1",<br>"value": {<br>"c1": "925",<br>"c2": "335"<br>}<br>},<br>{<br>"to": "Participant-2",<br>"value": {<br>"c1": "7",<br>"c2": "673"<br>}<br>}<br>] | [<br>{<br>"to": "Participant-1",<br>"value": {<br>"s1": "175",<br>"s2": "398"<br>}<br>},<br>{<br>"to": "Participant-2",<br>"value": {<br>"s1": "613",<br>"s2": "180"<br>}<br>}<br>] |

[ Previous ] [ Next ]

FIG. 8B

AES Symmetric Key — 902

Participant-1: 8617508895276526028534487041767241449516121495206749684369224986306210377787

Participant-2: -1056009299916453901103563510417271443591980223717474112349218200560601774

Participant-3: -1807504450877699202917755395491836419551457950258913786740145550427304152761

Pedersen Commitment — 904

{ "r": "367", "c": "982" }

{ "r": "172", "c": "329" }

{ "r": "261", "c": "149" }

[ Previous ]  [ Next ]

FIG. 9

SECRET ZERO GENERATION AND USAGE

BACKGROUND

Technical Field

This application generally relates to systems, methods and apparatuses, including computer program products, for creating and using a secret zero by multiple participants in a group.

Background

In the present era of cloud computing, organizations rely on secret vaults and cryptosystems to protect sensitive data, such as credentials, security tokens, digital certificates, and encryption keys. A secret zero, also commonly known as the secret of secrets, is often used in cryptosystems as a master secret that protects other secrets. To implement zero trust and availability of secret zero, distributed key generation (DKG) can be used to construct it. However, known DKG protocols require ($n^2$) messages to be sent over point-to-point secret channels (where n represents the number of participants involved in key generation), which makes these protocols cumbersome to implement as well as difficult to control and audit. In addition, a single programming error or an improper specification definition can make the most secure cryptographic model, including a model based on the secret zero, insecure. Furthermore, it is extremely difficult to uncover such vulnerabilities with any amount of testing.

Therefore, there is a need to formalize secret zero as a security goal with well-defined security requirements, as well as model a cryptosystem, including an approach, to construct secret zero using only broadcast messages without secret point-to-point channels.

SUMMARY OF THE INVENTION

The present invention features a cryptosystem design with a set of security requirements to achieve a set of specific goals, where the cryptosystem is modeled as a construction of one or more cryptographic proofs to satisfy these requirements. Thus, the security of this cryptosystem is at least defined as the sum of the security of its parts. In some embodiments, the cryptosystem design of the present invention is configured to implement security requirements for a secret zero for the purpose of data protection within an organization.

In one aspect, the present invention features a computer-implemented method for creating and using a secret zero by a plurality of participants in a group. The secret zero is representative of a master secret that protects a plurality of other secrets. The method includes creating, by a computing device of each participant, a first asymmetric key pair comprising a first public key and a first private key. The first public key is broadcasted to the group. The method also includes computing, by the computing device of each participant, a second asymmetric key pair comprising a second public key and a second private key after all other participants have completed broadcasting their first public keys to the group. The method also includes computing, by the computing device of each participant, (i) a plurality of private key shares of the second private key from a polynomial, (ii) a commitment to the polynomial, and (iii) a plurality of signatures for respective ones of the private key shares. The method also includes assigning, by the computing device of each participant, the plurality of private key shares among the group such that the corresponding participant retains one private key share and each of the other participants in the group is assigned one private key share that is encrypted using the first public keys of the corresponding participants. The method additionally includes creating, by the computing device of each participant, a symmetric key and a commitment for the symmetric key, and creating, by the computing device of each participant, a message comprising the second public key, the commitment to the polynomial, the plurality of encrypted private key shares assigned to the other participants, the plurality of signatures associated with the private key shares assigned to the other participants, and the commitment of the symmetric key. The method further includes encrypting, by the computing device of each participant, the message with the symmetric key, broadcasting, by the computing device of each participant, the encrypted message to the group of participants, and broadcasting, by the computing device of each participant, the symmetric key to the group after all other participants have completed broadcasting their messages.

In another aspect, the present invention features a computer program product, tangibly embodied in a non-transitory computer readable storage device, for creating and using a secret zero by a plurality of participants in a group. The secret zero is representative of a master secret that protects a plurality of other secrets. The computer program product includes instructions operable to cause a computing device of each participant to create a first asymmetric key pair comprising a first public key and a first private key, where the first public key is broadcasted to the group. The computer program product also includes instructions operable to cause the computing device of each participant to compute a second asymmetric key pair comprising a second public key and a second private key after all other participants have completed broadcasting their first public keys to the group, and compute (i) a plurality of private key shares of the second private key from a polynomial, (ii) a commitment to the polynomial, and (iii) signatures for respective ones of the plurality of private key shares. The computer program product also includes instructions operable to cause the computing device of each participant to assign the plurality of private key shares among the group such that the corresponding participant retains one private key share and each of the other participants in the group is assigned one private key share that is encrypted using the first public keys of the corresponding participants. The computer program product additionally includes instructions operable to cause the computing device of each participant to create a symmetric key and a commitment for the symmetric key, and create a message comprising a combination of the second public key, the commitment to the polynomial, the plurality of encrypted private key shares assigned to the other participants, the plurality of signatures associated with the private key shares assigned to the other participants, and the commitment of the symmetric key. The computer program product further includes instructions operable to cause the computing device of each participant to encrypt the message with the symmetric key, broadcast the encrypted message to the group of participants, and broadcast the symmetric key to the group after all other participants have completed broadcasting their messages.

Any of the above aspects can include one or more of the following features. In some embodiments, the polynomial comprises a plurality of random coefficients. In some embodiments, the commitments of the private key shares for each participant are computed based on the random coefficients of the polynomial using a Feldman's verifiable secret sharing (VSS) scheme. In some embodiments, in each message, each of the private key shares assigned to the other participants in the group is encrypted with the first public key of the intended participant. In some embodiments, the one private key share retained by the participant is not encrypted or associated with a signature. In some embodiments, the commitment for the symmetric key is created based on a Pedersen scheme.

In some embodiments, the encrypted messages broadcasted by the other participants in the group is decrypted using their corresponding broadcasted symmetric keys and the symmetric key commitment in each of the decrypted messages broadcasted by the other participants is verified. In some embodiments, if the verification of any one of the symmetric key commitment fails, an error alert is broadcasted to the group of participants. The error alert includes the failed commitment and the corresponding symmetric key. In addition, the secret zero creation process is terminated.

In some embodiments, if the verification is successful, the encrypted private key shares intended for the participant is selected from the plurality of decrypted messages and the selected encrypted private key shares intended for the participant is decrypted using the first private key of the participant. Further, the plurality of decrypted private key shares that are intended for the corresponding participant are opened and the validity and integrity of each of the other participants is verified based on their broadcasted messages. In some embodiments, verifying the validity and integrity of each of the other participants includes verifying the validity of the private key share intended for the participant based on the corresponding polynomial commitment, where the polynomial commitment is included in the decrypted message, and verifying the integrity of the private key share intended for the participant based on the corresponding signature, where the signature is included in the decrypted message In some embodiments, if the verification is successful, a group public key is computed as a product of the second public key of the corresponding participant and the second public keys extracted from the decrypted messages broadcasted by the other participants in the group. In addition, a group private key share is computed as a sum of the retained second private key share of the corresponding participant and the private key shares intended for the corresponding participant extracted from the decrypted messages broadcasted by the other participants in the group. Further, a signature on the group public key is computed with the public key of the participant to indicate acceptance of the group public key by the participant. In some embodiments, the group public key and the group private key shares held by the participants in the group are representative of the secret zero, the group public key being usable to perform encryptions or verify signatures, and the group private key shares being usable to perform decryptions or create signatures.

In some embodiments, all of the participants in the group are required to create the secret zero. In some embodiments, a number (k) less than or equal to a number (n) of all of the participants in the group is required to use the secret zero to perform decryptions or create signatures.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 5 shows a set of exemplary second asymmetric key pairs generated by the process of FIG. 2, according to some embodiments of the present invention.

FIG. 6 shows a set of exemplary coefficients for the polynomials generated by the process of FIG. 2, according to some embodiments of the present invention.

FIG. 7 shows exemplary Feldman commitments computed by the process of FIG. 2, according to some embodiments of the present invention.

FIGS. 8A and 8B show exemplary encrypted private key shares and signatures computed by the process of FIG. 2, according to some embodiments of the present invention.

FIG. 9 shows exemplary symmetric keys and Pedersen commitments computed by the process of FIG. 2, according to some embodiments of the present invention.

DETAILED DESCRIPTION

Figure 1:
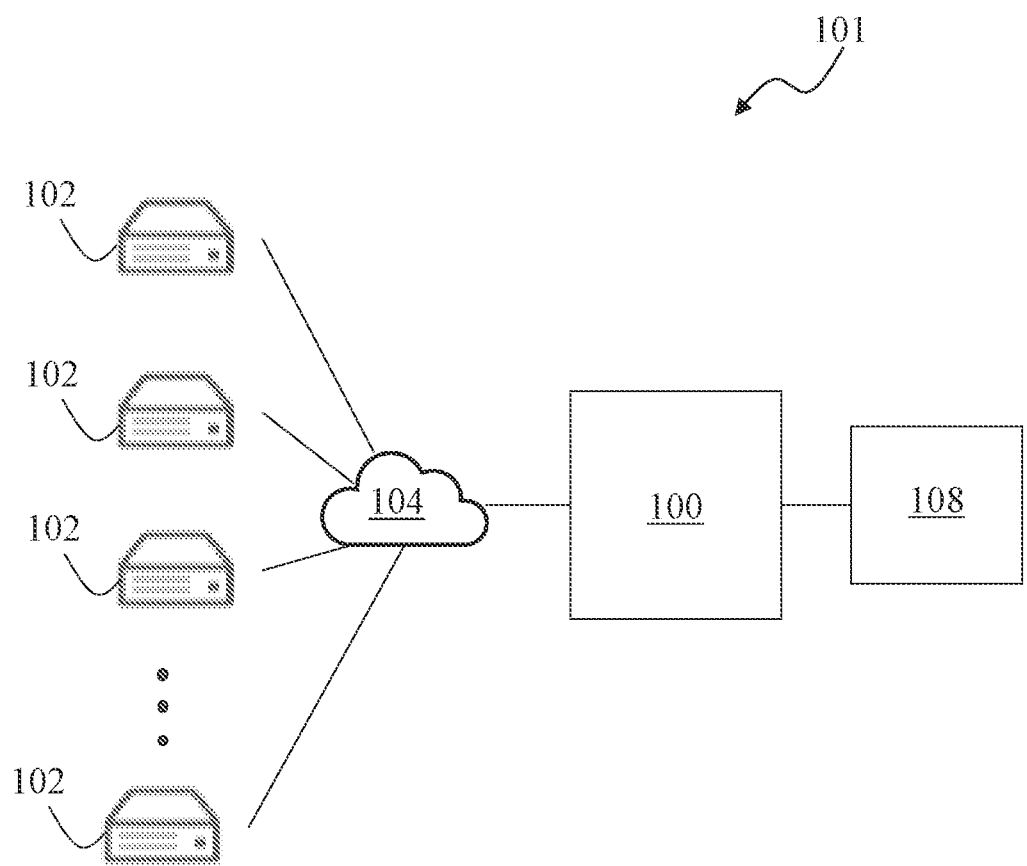
FIG. 1 shows an exemplary computing environment in which a secret zero cryptosystem is constructed, according to some embodiments of the present invention.

FIG. 1 shows an exemplary computing environment 101 in which a secret zero cryptosystem 100 is constructed, according to some embodiments of the present invention. As shown, the computing environment 101 generally includes multiple participant computing devices 102, a communication network 104, the secret zero cryptosystem system 100, and at least one database 108.

In the context of the present invention, a secret zero is defined as a secret that protects other secrets. Creating a secret zero generally involves generating a public key and multiple private key shares distributed among multiple participants associated with respective ones of the multiple computing devices 102. The client computing device 102 can connect to the communication network 104 to communicate with the cryptosystem 100 and/or the database 108 to provide inputs and receive outputs for the purpose of secret zero creation as described herein. Exemplary computing devices 102 include, but are not limited to, telephones, desktop computers, laptop computers, tablets, mobile devices, smartphones, and internet appliances. It should be appreciated that other types of computing devices capable of connecting to the components of the computing system 101 can be used without departing from the scope of invention.

The communication network 104 enables components of the computing environment 101 to communicate with each other to perform the task of secret zero creation described herein. The network 104 may be a local network, such as a LAN, or a wide area network, such as the Internet and/or a cellular network. In some embodiments, the network 104 is comprised of several discrete networks and/or sub-networks (e.g., cellular to Internet) that enable the components of the computing environment 101 to communicate with each other.

The cryptosystem 100 is a combination of hardware, including one or more processors and one or more physical memory modules and specialized software engines that execute on the processor of the cryptosystem 100, to receive data from other components of the computing environment 101, transmit data to other components of the computing environment 101, and perform functions as described herein. In some embodiments, the components of the cryptosystem 100 are specialized sets of computer software instructions programmed onto a dedicated processor in the cryptosystem 100 and can include specifically-designated memory locations and/or registers for executing the specialized computer software instructions.

The database 108 is a computing device (or in some embodiments, a set of computing devices) that is coupled to and in communication with the cryptosystem 100 and is configured to provide, receive, and store various types of data received and/or created for the purpose of secret zero creation and/or usage. For example, the database 108 can be configured to store messages and alerts broadcasted by participants for audit and control by the cryptosystem 100 and a group public key associated with the secret zero to be later used by the cryptosystem 100 to perform encryptions and/or verify signatures. In some embodiments, all or a portion of the database 108 is integrated with the cryptosystem 100 or located on a separate computing device or devices. For example, the database 108 can comprise one or more databases, such as MySQL™ available from Oracle Corp. of Redwood City, California.

Figure 2:
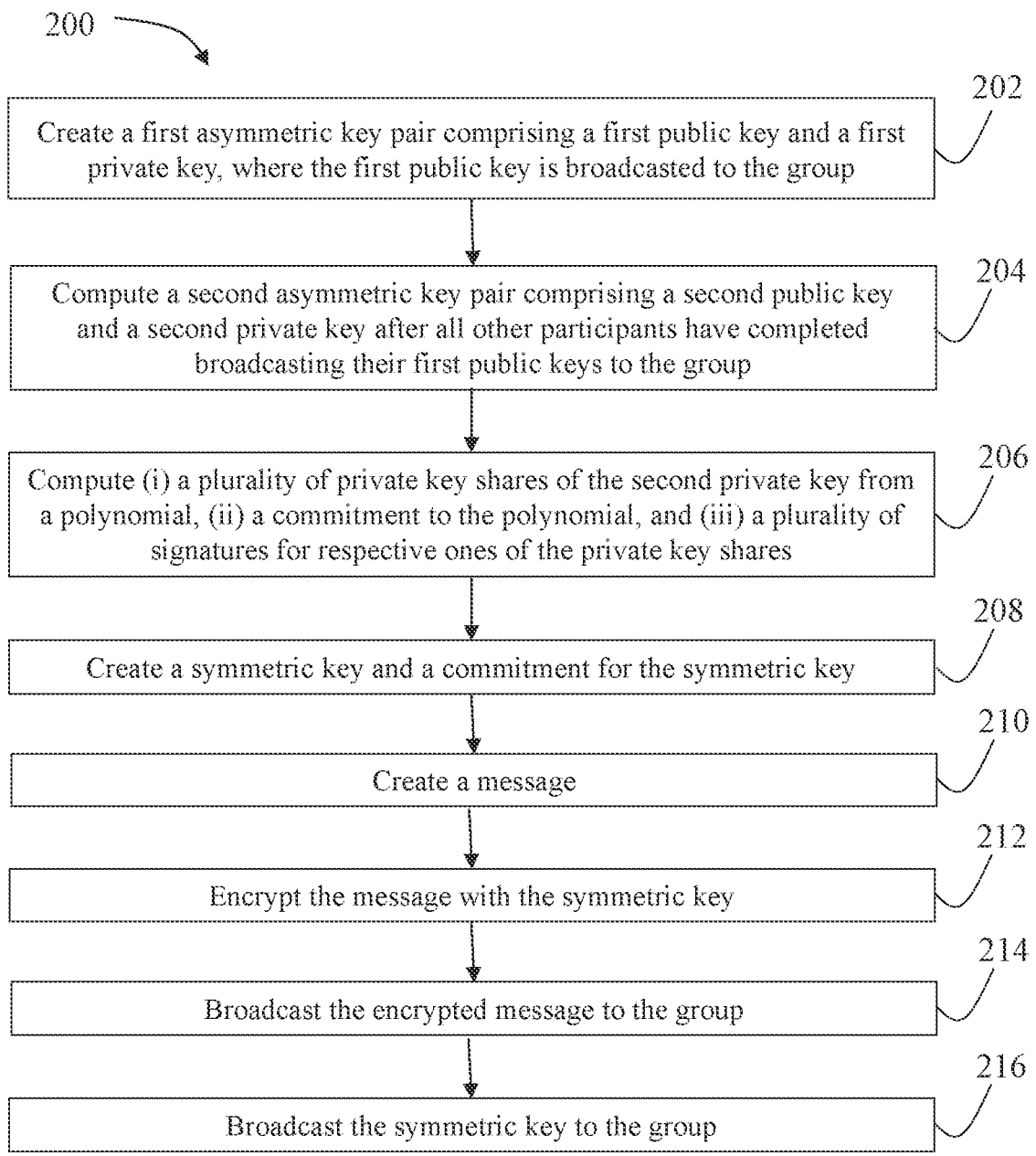
FIG. 2 shows an exemplary process utilized by the computing environment of FIG. 1 for creating a secret zero, according to some embodiments of the present invention.

FIG. 2 shows an exemplary process 200 utilized by the computing environment 101 of FIG. 1 for creating a secret zero, according to some embodiments of the present invention. In some embodiments, creating a secret zero comprises generating a group public key and multiple private key shares distributed among a group of participants.

Figures 3, 4:
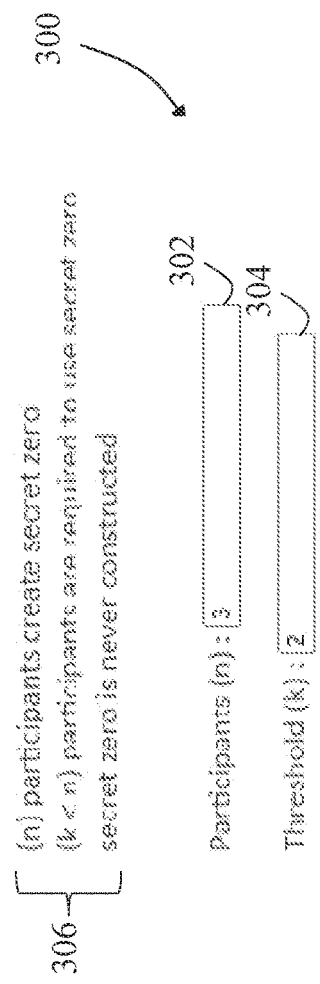
FIG. 3 shows an exemplary user interface provided by the cryptosystem of FIG. 1 for obtaining information from a user for defining a set of security requirements, according to some embodiments of the invention.
FIG. 4 shows a set of exemplary first asymmetric key pairs generated by the process of FIG. 2, according to some embodiments of the present invention.

In some embodiments, prior to secret zero generation, the cryptosystem 100 of the computing environment 101 defines a set of security requirements/rules for creating and using a secret zero. FIG. 3 shows an exemplary user interface 300 provided by the cryptosystem 100 of FIG. 1 for obtaining information from a user required to define a set of security requirements, according to some embodiments of the invention. The interface 300 can ask the user via text box 302 to specify the number of participants (n) involved for jointly creating the secret zero. In some embodiments, the interface 300 additionally requests the user to provide identification of these n participants and their contact information. Furthermore, the interface 300 can ask the user via text box 304 to specify the threshold number of participants (k) needed to use the secret zero. The interface 300 can also display an explanation of the security requirements 306 for secret zero creation and usage, which include (i) splitting the secret zero into n shares distributed to a group of n participants; (ii) at least k of the n shares are required to use the secret zero; and (iii) the secret zero is never constructed as a whole and only exists as private key shares held by the participants. These security requirements have several advantages including (i) resistant to dishonest dealers, (ii) resistant to dishonest participants, and (iii) no single points of failure. In the context of the present invention, "dishonest dealers" and "dishonest participants" generally refer to dishonest, corrupt, or compromised individuals, computer programs or nodes in the computing environment 101.

Further, the cryptosystem 100 can allow the user to define a set of numerical constants that are used by various algorithms in process 200 for the purpose of secret zero creation, such constants p, q, g and h which will appear in the equations described below. In some embodiments, p and q are safe prime numbers of bit length 2048 bits, q is set as $(p-1)/2$, which is the Sophie Germain prime of p, and g is a generator in the cyclic group G of order p. As well understood by a person of ordinary skill in the art, the numerical values for these constants are illustrative only and can be adapted by the user to suit his encryption/decryption needs.

As shown in FIG. 2, the process 200 starts with the computing device 102 of each participant in the group of n participants creating a first asymmetric key pair including a first public key and a first private key (step 202). Therefore, n participants are adapted to create n such key pairs. Each key pair can be created using the Diffie Hellman algorithm as follows:

$$A = g^a \bmod p, \qquad \text{(Equation 1)}$$

where A represents the public key, g and p are predefined constants, a is a randomly chosen private key less than the predefined constant q. FIG. 4 shows a set of exemplary first asymmetric key pairs generated at step 202 of process 200 of FIG. 2 for the group of participants chosen from the interface of FIG. 3, according to some embodiments of the present invention. In some embodiments, for each participant, the first private key 402 is kept by the participant while the first public key 404 is broadcasted to the entire participant group. Other participants in the group are adapted to use the sender participant's broadcasted public key to encrypt secret shares that they wish to give to the sender participant, as will be explained below in detail.

At step 204 of process 200, the computing device 102 of each participant in the group of n participants creates a second asymmetric key pair including a second public key and a second private key, after all other participants have completed broadcasting their first public keys to the group (from step 202). Therefore, n participants are adapted to create n such key pairs. In some embodiments, the Diffie Hellman algorithm of Equation 1 is also used to create the second asymmetric key pairs. Alternatively, other threshold asymmetric key generation algorithms can be used without departing from the spirit of the present invention. FIG. 5 shows a set of exemplary second asymmetric key pairs generated at step 204 of process 200 of FIG. 2 for the group of participants chosen from the interface of FIG. 3, according to some embodiments of the present invention. In some embodiments, the participants' second private keys 502 from the second asymmetric key pairs are used to create private key shares and their second public keys 504 from the second asymmetric key pairs are used to create the group public key, as will be explained below in detail.

At step 206, the computing device 102 of each participant in the group of n participants computes (i) multiple private key shares from a polynomial, (ii) a commitment to the polynomial, and (iii) multiple signatures for respective ones of the private key shares. In particular, every participant's computing device 102 can generate a random polynomial of the form:

$$f(x) = a_0 + a_1 x + \ldots + a_{k-1} x^{k-1}, \qquad \text{(Equation 2)}$$

Where $a_0$ is the participant's private key of the second asymmetric key pair 502 (from step 204), the remaining coefficients are randomly generated numbers, and k is the threshold number of participants (k) 304 needed to use the secret zero. At this step, n participants are adapted to create n such polynomials. FIG. 6 shows a set of exemplary coefficients 602 for the polynomials generated at step 206 of process 200 of FIG. 2 for the group of participants chosen from the interface of FIG. 3, according to some embodiments of the present invention. As explained above, coefficient $a_0$ of each polynomial is the corresponding participant's private key of the second asymmetric key pair 502.

In this step, every participant's computing device 102 also computes a set of commitments corresponding to respective ones of the coefficients of the polynomial generated by the participant using Equation 2. In general, each commitment ensures that a participant cannot deceive others by providing a wrong value for the corresponding coefficient. For example, the commitments can be computed using the Feldman's verifiable secret sharing (VSS) algorithm as follows:

$$C = g^c \bmod p, \quad \text{(Equation 3)}$$

where C represents the Feldman commitments, c represents the coefficients 602 of the polynomial from Equation 2, and p is a predefined constant. In some embodiments, the Feldman commitment for coefficient $a_0$ of the polynomial in Equation 2 is the public key 504 of the participant's second asymmetric key pair (from step 204). FIG. 7 shows exemplary Feldman's VSS commitments 702 computed at step 206 of process 200 of FIG. 2 for the exemplary coefficients 602 of the polynomials determined for respective ones of the group of participants chosen from the interface of FIG. 3, according to some embodiments of the present invention.

In this step, every participant computing device 102 can create signatures for the other participants in the group. These signatures are created by first creating n shares of the participant's private key 502 of his second asymmetric key pair (from step 204) using, for example, the following equation:

$$f(x) = a_0 + a_1 x + \ldots + a_{k-1} x^{k-1} \bmod q, \quad \text{(Equation 4)}$$

where f (x) are the shares for x=1 . . . n, $a_0 \ldots a_{k-1}$ are coefficients 602 of the polynomial from Equation 2, and q is a predefined constant. Of these n shares, the participant retains one share for himself while assigning the remaining shares to the other participants in the group. The assigned n-1 shares to the other participants in the group can be encrypted with the participant's public key 404 of the first symmetric key pair created at step 202. The private key shares are then signed (e.g., signatures are created) using the participant's private key 502 of his second asymmetric key pair (from step 204). In some embodiments, the share retained by the participant himself is not encrypted and does not have signature created.

FIGS. 8A and 8B show exemplary signatures computed by each participant at step 206 of process 200 of FIG. 2 for other participants in the group of participants that are chosen from the interface of FIG. 3, according to some embodiments of the present invention. As shown, for the 3 shares created by each participant using his polynomial coefficients 602 (column 804), each participant retains one share (column 802) and assigns the other 2 shares to the other participants (column 806). The shares assigned to the others are then encrypted (column 808) with the participant's public key 404 of the first symmetric key pair (column 810) and signatures (column 812) are created using the participant's private key 502 of his second asymmetric key pair.

Referring back to FIG. 2, at step 208 of process 200, the computing device 102 of each participant is adapted to further crate a symmetric key and a commitment for the symmetric key. In some embodiments, the symmetric key can be generated using the Advanced Encryption Standard (AES) algorithm. In some embodiments, the commitment is generated using the Pedersen algorithm as follows:

$$c = (g^r, h^m) \bmod p, \quad \text{(Equation 5)}$$
$$PC = (r, c),$$

where PC represents the Pedersen commitment, g, h and p represent predefined constants, r is a randomly generated number, and m is the message for which the commitment is being crated, which is the symmetric key in this case. FIG. 9 shows exemplary symmetric keys 902 and Pedersen commitments 904 computed at step 208 of process 200 of FIG. 2 by the group of participants chosen from the interface of FIG. 3, according to some embodiments of the present invention.

At step 210 of process 200, the computing device 102 of each participant is configured to create a message that includes the public key 502 of the second asymmetric key pair (from step 204), the commitment 702 to the polynomials (from step 206), the encrypted private key shares 808 assigned to the other participants (from step 206), the signatures 812 associated with the private key shares assigned to the other participants (from step 206), and the commitment 904 of the symmetric key (from step 208).

At step 212 of process 200, the computing device 102 of each participant encrypts the message (from step 210) with his corresponding symmetric key (from step 208). At step 214, each participant's computing device 102 broadcasts his encrypted message to others in the group. At step 216, after the broadcasting is completed, each participant's computing device 102 broadcasts his symmetric key (from step 208) to the group, which is the key that the participant used to encrypt his message to the group.

Figure 10:
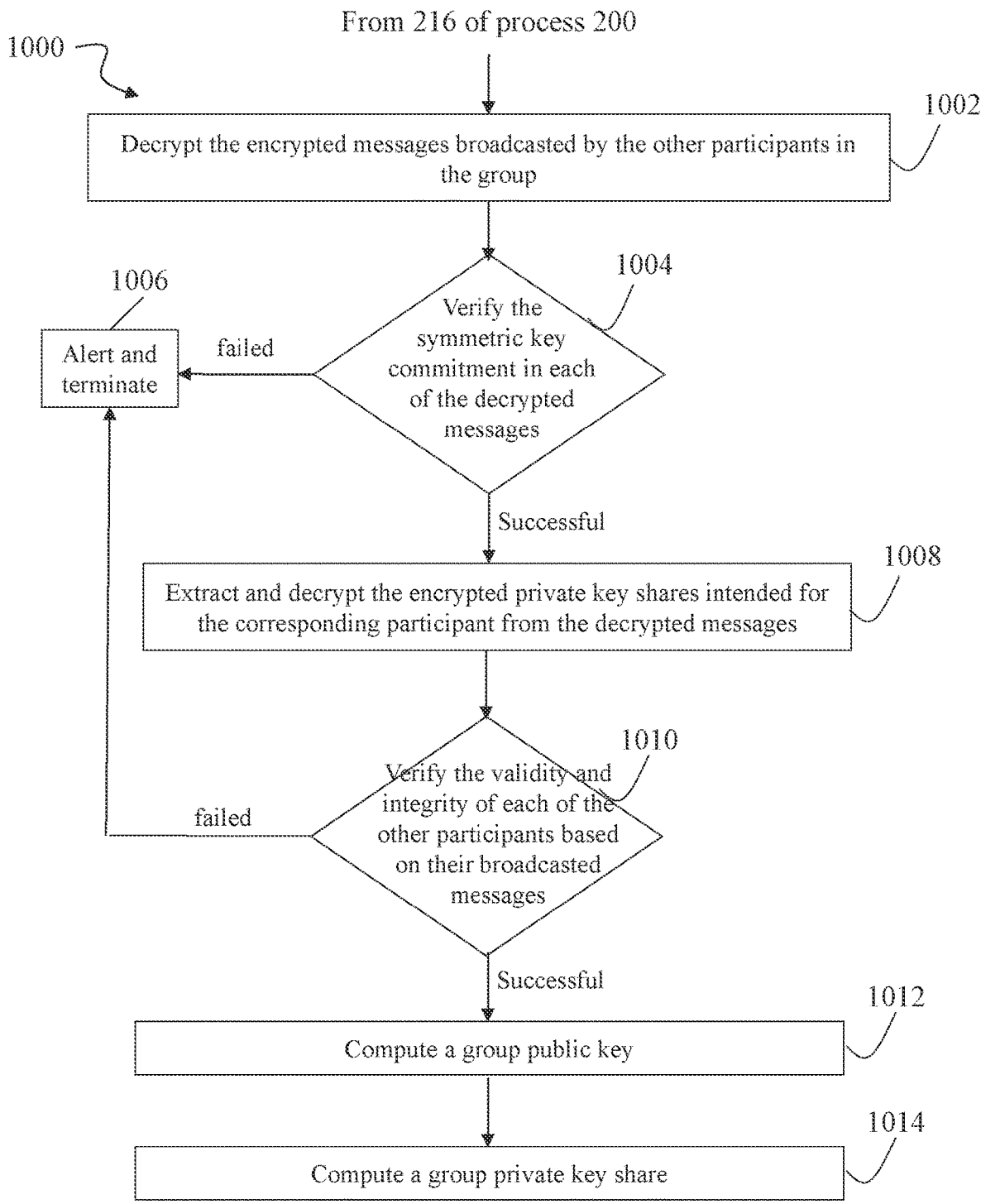
FIG. 10 shows an exemplary process that continues from the process of FIG. 2 for creating the secret zero, according to some embodiments of the present invention.

FIG. 10 shows an exemplary process 1000 that continues from the process 200 of FIG. 2 for creating the secret zero after a participant receives messages broadcasted from the other participants in the group, according to some embodiments of the present invention. At step 1002, after a participant in the group of n participants receives n-1 encrypted messages from other participants in the group, the participant can open the encrypted messages (from step 214) received from the other participants by decrypting the messages using the corresponding symmetric keys broadcasted by the other participants (from step 216). To ascertain that the correct symmetric keys are broadcasted and prevent key spoofing, the computing device 102 of each participant at step 1004 extracts the commitments 904 of the symmetric keys (from step 208) that are included in respective ones of the broadcasted messages and verify these commitments of the symmetric keys. For example, if the commitment is a Pedersen commitment, it can be verified as follows:

$$PC = (r, c), \quad \text{(Equation 6)}$$

$$checkC = (g^r, h^m) \bmod p,$$

where verification returns true if checkC equals c, but returns false otherwise.

For each participant, if the verification for any one of the symmetric key commitments fails, the computing device 102 of the participant is configured to broadcast an error alert to the group of participants and terminate the entire secret zero process at step 1006. Alternatively, if the verification is successful for all the symmetric key commitments, at step 1008 each participant is adapted to extract the encrypted private key share intended for that participant from each of the decrypted messages. There should be one encrypted private key share per participant in every decrypted message received from the other participants. Each participant can decrypt his private key shares extracted from the messages using his private key of the first asymmetric key pair (from step 202).

At step 1010, each participant verifies that (i) his private key shares received from the other participants are correct/valid (e.g., the other participants have not cheated by sending them invalidate shares) and/or (ii) the integrity of the sender participants. In some embodiments, to verify the correctness/validity of his private key shares, each participant uses his corresponding polynomial commitments, e.g., the Feldman's VSS commitments that are included in the messages. For example, the Feldman's VSS commitments from every message can be verified by a participant as follows:

$$g^s \bmod p = C_0 + C_1^{x^1} + \ldots + C_{k-1}^{x^{k-1}} \bmod p, \quad \text{(Equation 7)}$$

Where g and p are predefined constants, s is the private key share of the receiver participant, $C_0$ is commitment 0 (or public key of the second asymmetric key pair of the sender participant associated with the message), $C_1$ is commitment 1 and $C_k$ is commitment k, where k represents the threshold number of participants needed to use the secret zero. Verification of Feldman's VSS commitments is successful if the value on the left of the equal sign in Equation 7 equals the value on the right of the equal sign.

In some embodiments, to verify the integrity of the sender participants, each participant verifies his share signatures with the corresponding public keys of the second asymmetric pairs of the sender participants that are also included in the messages. If any of commitment or signature verification fails, an error alert is broadcasted to the group of participants and the entire secret zero process is terminated at step 1006.

If the verifications at step 1010 is successful, process 1000 continues at step 1012 at which every participant computes a group public key as a product of (i) his public key of the second asymmetric key pair and (ii) the public keys of the second asymmetric key pairs of the other participants that are extracted from the messages broadcasted by the other participants, followed by modulo of the product with a predefined constant. For example, the group public key can be computed as follows:

$$h = \prod_{i=1}^{n} h_i \bmod p, \quad \text{(Equation 8)}$$

where h represents the group public key, n is the total number of participants in the group, hi represents the public key of the second asymmetric key pair of each participant in the group, and p is a predefined constant. In some embodiments, every participant is adapted to generate the same group public key value. In some embodiments, a signature on the group public key is created by the computing device 102 of each participant with the public key of that participant. The signature indicates acceptance of the group public key by the participant.

At step 1014, the computing device 102 of each participant is adapted to compute a group private key share as a sum of (i) the private key share that the participant retained for himself and (ii) the private key shares intended for the participant that the participant extracted from the messages broadcasted from the other participants, followed by modulo of the sum with a predefined constant. For example, the group private key share of a participant can be computed as follows:

$$x_i = \sum_{j=1}^{n} s_{ji} \bmod q, \quad \text{(Equation 9)}$$

where $x_i$ represents the group private key share for the ith participant, n is the total number of participants in the group, s represents the private key share created by the jth participant to give to the ith participant, and q is a predefined constant. In some embodiments, the group private key shares for the group of participants are not the same from one another.

In general, the group public key and the group private key shares held by the participants in the group are representative of the secret zero. The group public key is usable by the cryptosystem 100 to perform encryptions of secrets or verify signatures, while the group private key shares are usable by the cryptosystem 100 to perform decryptions to extract secrets or create signatures. In some embodiments, the group public key is saved in the cryptosystem 100 (e.g., in database 108) while the private key shares are stored at the individual computing devices 102 of the participants.

In some embodiments, all the participants in the group are required to participate in the secret zero creation processes 200 and 1000 of FIGS. 2 and 10 to generate the group public key and the private key shares. However, a number (k) less than or equal to the number (n) of all of the participants in the group is needed to perform decryptions or create signatures. One advantage of such secret zero creation scheme is that a private key is not constructed during key creation, but only exists as private key shares distributed among the participants. Another advantage is that no third party (e.g., a dealer) is required to create a private key and distribute its shares. Yet another advantage is that only 3n messages are generated during key generation, which is a reduction from the (n²+3n) messages generated using a prior art scheme, where n represents the total number of participants in the group.

As an example, a group public key and the participants' private key shares created using processes 200 and 1000 of FIGS. 2 and 10 can be used in an Elgamal Threshold cryptosystem for encrypting and decrypting secrets. In this example, the cryptosystem 100 can use the group public key to perform an Elgamal encryption of a message (e.g., a numeric message consisting of the number 66). More specifically, the Elgamal encryption of a message using the group public key can be as follows:

$$C1 = g^l \bmod p, \quad \text{(Equation 10)}$$

$$C2 = m \cdot b^l \bmod p, \quad \text{(Equation 11)}$$

where g and p are predefined constants, l is randomly chosen number, m is the message (e.g., number 66) to be encrypted, and b is the group public key. The resulting encryption (i.e., the Elgamal encrypted cipher) is (C1, C2).

The cryptosystem 100 can also use the participants' private key shares to perform a threshold Elgamal decryption on the encrypted message to obtain the original message. To perform the decryption, the cryptosystem 100 can ask a user to select the participants available for decryption, where the number of participants selected (k) can be less than or equal to the total number of participants available (n). For example, 2 out of 3 available participants can be selected. Next, the Elgamal decryption can be performed as follows:

$$t = C1^s \bmod p, \quad \text{(Equation 12)}$$

$$u = C2 \cdot \prod_{i=1}^{k} t_i^{w_i} \bmod p \quad \text{(Equation 13)}$$

$$v = u \bmod inverse\, p, \quad \text{(Equation 14)}$$

$$decrption = c2^v \bmod p, \quad \text{(Equation 15)}$$

where C1 and C2 are the Elgmal Cipher from equations 10 and 11, s is the secret share of a selected participant, p is a predefined constant and t is the decryption share of a selected participant generated at Equation 12. In addition, k is the number of participants selected for the decryption, $w_i$ is the Lagrange weight of the participant's share, and u is an aggregate computed at Equation 13. Further, decryption of Equation 15 represents the decrypted message (e.g., number 66).

In another example, a secret zero comprising a group public key and a set of private key shares are created by a group of 3 participants using processes 200 and 1000 of FIGS. 2 and 10. However, only 2 of the 3 participants are required for decryption. During encryption, if a user has a secret he would like to protect, the user can retrieve the group public key (e.g., from database 108), encrypt his secret with the group public key, and save the encrypted secret in the database 108. Later, if the user wants to decrypt the encrypted secret, he can retrieve the encrypted secret from database 108 and send it to a minimum of 2 of the 3 participants in the group that created the secret zero. For each of the 2 or 3 participants who received the encrypted secret (i.e., a recipient participant), the recipient participant creates a decrypted share of the secret using his private key share and transmits the decrypted share to the user. The user can then combine the decrypted shares from all the recipient participants to obtain the decrypted secret in its entirety. In some embodiments, the user who encrypts a secret can be different than the user who wants to decrypt the encrypted secret. In some embodiments, the user can be one of the three participants in the participant group that created the secret zero or a different person who is outside of the participant group.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random-access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile computing device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile computing device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

The invention claimed is:

1. A computer-implemented method for creating and using a secret zero by a plurality of participants in a group, the secret zero representative of a master secret that protects a plurality of other secrets, the method comprising:
 creating, by a computing device of each participant from among the plurality of participants, a first asymmetric key pair comprising a first public key and a first private key, wherein the first public key is broadcasted to the group;
 computing, by the computing device of each participant, a second asymmetric key pair comprising a second public key and a second private key after all other participants have completed broadcasting their first public keys to the group;
 computing, by the computing device of each participant, (i) a plurality of private key shares from a polynomial, (ii) a commitment to the polynomial, and (iii) a plurality of signatures for respective ones of the private key shares;
 assigning, by the computing device of each participant, the plurality of private key shares among the group such that the corresponding participant retains one private key share from among the plurality of private key shares and each of the other participants in the group is assigned one private key share that is encrypted using the first public keys of the corresponding participants;
 creating, by the computing device of each participant, a symmetric key and a commitment for the symmetric key;
 creating, by the computing device of each participant, a message comprising the second public key, the commitment to the polynomial, the plurality of encrypted private key shares assigned to the other participants, the plurality of signatures associated with the private key shares assigned to the other participants, and the commitment of the symmetric key;
 encrypting, by the computing device of each participant, the message with the corresponding symmetric key;
 broadcasting, by the computing device of each participant, the encrypted message to the group of participants; and
 broadcasting, by the computing device of each participant, the corresponding symmetric key to the group after all other participants have completed broadcasting their messages.

2. The computer-implemented method of claim 1, further comprising:
 decrypting, by the computing device of each participant, the encrypted messages broadcasted by the other participants in the group using their corresponding broadcasted symmetric keys; and verifying, by the computing device of each participant, the symmetric key commitment in each of the decrypted messages broadcasted by the other participants.

3. The computer-implemented method of claim 2, further comprising, if the verification of any one of the symmetric key commitment fails:
   broadcasting, by the computing device of the participant, an error alert to the group of participants, wherein the error alert includes the failed commitment and the corresponding symmetric key; and
   terminating, by the computing device of the participant, the secret zero creation process.

4. The computer-implemented method of claim 2, further comprising, if the verification is successful:
   selecting from the plurality of decrypted messages, by the computing device of each participant, the encrypted private key shares intended for the participant;
   decrypting, by the computing device of each participant, the selected encrypted private key shares intended for the participant using the first private key of the participant;
   opening, by the computing device of each participant, the plurality of decrypted private key shares that are intended for the corresponding participant; and
   verifying, by the computing device of each participant, validity and integrity of each of the other participants based on their broadcasted messages.

5. The computer-implemented method of claim 4, wherein verifying the validity and integrity of each of the other participants comprises:
   verifying the validity of the private key share intended for the participant based on the corresponding polynomial commitment, wherein the polynomial commitment is included in the decrypted message; and
   verifying the integrity of the private key share intended for the participant based on the corresponding signature, wherein the signature is included in the decrypted message.

6. The computer-implemented method of claim 4, further comprising:
   computing, by the computing device of each participant, a group public key as a product of the second public key of the corresponding participant and the second public keys extracted from the decrypted messages broadcasted by the other participants in the group;
   computing, by the computing device of each participant, a group private key share as a sum of the retained second private key share of the corresponding participant and the private key shares intended for the corresponding participant extracted from the decrypted messages broadcasted by the other participants in the group; and
   computing, by the computing device of each participant, a signature on the group public key with the public key of the participant to indicate acceptance of the group public key by the participant.

7. The computer-implemented method of claim 6, wherein the group public key and the group private key shares held by the participants in the group are representative of the secret zero, the group public key being usable to perform encryptions or verify signatures, the group private key shares being usable to perform decryptions or create signatures.

8. The computer-implemented method of claim 7, wherein all of the participants in the group are required to create the secret zero.

9. The computer-implemented method of claim 8, wherein a number (k) less than or equal to a number (n) of all of the participants in the group is required to use the secret zero to perform decryptions or create signatures.

10. The computer-implemented method of claim 1, wherein the polynomial comprises a plurality of random coefficients.

11. The computer-implemented method of claim 10, wherein the commitments of the private key shares for each participant are computed based on the random coefficients of the polynomial using a Feldman's verifiable secret sharing (VSS) scheme.

12. The computer-implemented method of claim 1, wherein in each message, each of the private key shares assigned to the other participants in the group is encrypted with the first public key of the intended participant.

13. The computer-implemented method of claim 1, wherein the one private key share retained by the participant is not encrypted or associated with a signature.

14. The computer-implemented method of claim 1, wherein the commitment for the symmetric key is created based on a Pedersen scheme.

15. A computer program product, tangibly embodied in a non-transitory computer readable storage device, for creating and using a secret zero by a plurality of participants in a group, the secret zero representative of a master secret that protects a plurality of other secrets, the computer program product including instructions operable to cause a computing device of each participant from among the plurality of participants to:
   create a first asymmetric key pair comprising a first public key and a first private key, wherein the first public key is broadcasted to the group;
   compute a second asymmetric key pair comprising a second public key and a second private key after all other participants have completed broadcasting their first public keys to the group;
   compute (i) a plurality of private key shares from a polynomial, (ii) a commitment to the polynomial, and (iii) signatures for respective ones of the plurality of private key shares;
   assign the plurality of private key shares among the group such that the corresponding participant retains one private key share from among the plurality of private key shares and each of the other participants in the group is assigned one private key share that is encrypted using the first public keys of the corresponding participants;
   create a symmetric key and a commitment for the symmetric key;
   create a message comprising the second public key, the commitment to the polynomial, the plurality of encrypted private key shares assigned to the other participants, the plurality of signatures associated with the private key shares assigned to the other participants, and the commitment of the symmetric key;
   encrypt the message with the corresponding symmetric key; and
   broadcast the encrypted message to the group of participants; and
   broadcast the corresponding symmetric key to the group after all other participants have completed broadcasting their messages.

16. The computer program product of claim 15, further comprising instructions operable to cause a computing device of each participant to:

decrypt the encrypted messages broadcasted by the other participants in the group using their corresponding broadcasted symmetric keys; and verify the symmetric key commitment in each of the decrypted messages broadcasted by the other participants.

17. The computer program product of claim 15, further comprising instructions operable to cause a computing device of each participant to, if the verification is successful:

select from the plurality of decrypted messages the encrypted private key shares intended for the participant;

decrypt the selected encrypted private key shares intended for the participant using the first private key of the participant;

open the plurality of decrypted private key shares that are intended for the participant;

verify validity and integrity of each of the other participants based on their broadcasted messages.

18. The computer program product of claim 17, further comprising instructions operable to cause a computing device of each participant to:

compute a group public key as a product of the second public key of the participant and the second public keys extracted from the decrypted messages broadcasted by the other participants in the group;

compute a group private key share as a sum of the retained second private key share of the participant and the private key shares intended for the participant extracted from the decrypted messages broadcasted by the other participants in the group; and compute a signature on the group public key with the public key of the participant to indicate acceptance of the group public key by the participant.

19. The computer program product of claim 17, wherein the group public key and the group private key shares held by the participants in the group are representative of the secret zero, the group public key being usable by the participant to perform encryptions or verify signatures, and the group private key shares of the participants being usable to perform decryptions or create signatures.

20. The computer program product of claim 17, wherein all of the participants in the group are required to create the secret zero, and wherein a number (k) less than or equal to a number (n) of all of the participants in the group is required to use the secret zero to perform decryptions or create signatures.

* * * * *

UNITED STATES PATENT AND TRADEMARK OFFICE
CERTIFICATE OF CORRECTION

PATENT NO.           : 12,316,751 B2
APPLICATION NO.      : 18/143332
DATED                : May 27, 2025
INVENTOR(S)          : Rayan Raghuram et al.

Page 1 of 1

It is certified that error appears in the above-identified patent and that said Letters Patent is hereby corrected as shown below:

In the Specification

Column 11, Line 27 reads:
"$v = u\mathrm{mod}inversep$, (Equation 14)"
Should read:
-- $v = u\ modinverse\ p$, (Equation 14) --

Signed and Sealed this
Eighth Day of July, 2025

Coke Morgan Stewart
*Acting Director of the United States Patent and Trademark Office*